US006680473B2

(12) United States Patent
Ohmukai et al.

(10) Patent No.: US 6,680,473 B2
(45) Date of Patent: Jan. 20, 2004

(54) ATOMIC BEAM CONTROL APPARATUS AND METHOD

(75) Inventors: Ryuzo Ohmukai, Tokyo (JP); Masayoshi Watanabe, Tokyo (JP)

(73) Assignee: Communications Research Laboratory, Tokyo (JP)

( * ) Notice: Subject to any disclaimer, the term of this patent is extended or adjusted under 35 U.S.C. 154(b) by 27 days.

(21) Appl. No.: 10/014,344

(22) Filed: Dec. 14, 2001

(65) Prior Publication Data

US 2002/0113205 A1 Aug. 22, 2002

(30) Foreign Application Priority Data

Dec. 27, 2000 (JP) ....................................... 2000-398289

(51) Int. Cl.[7] ............................. H05H 3/02; G01J 3/36; G01J 3/30

(52) U.S. Cl. ........................ 250/251; 356/307; 356/311

(58) Field of Search .......................... 250/251; 356/307, 356/311

(56) References Cited

U.S. PATENT DOCUMENTS

| | | | | |
|---|---|---|---|---|
| 4,327,288 A | * | 4/1982 | Ashkin et al. | 250/251 |
| 4,386,274 A | * | 5/1983 | Altshuler | 250/251 |
| 4,762,993 A | * | 8/1988 | Moses | 250/251 |
| 5,360,764 A | * | 11/1994 | Celotta et al. | 250/251 |

FOREIGN PATENT DOCUMENTS

| | | |
|---|---|---|
| JP | 5-251199 | 9/1993 |
| JP | 5-252031 | 9/1993 |
| JP | 9-117640 | 5/1997 |
| JP | 2002-531861 | 9/2002 |

OTHER PUBLICATIONS

V. Natsarajan et al., "High–contrast, high–resolution focusing of neutral atoms using light forces", Phys. Rev. A53 (1996), pp. 4381–4385.

W.R. Anderson et al., "Minimizing feature width in atom optically fabricated chromium nanostructures", Phys. Rev. A59 (1999), pp. 2476–2485.

R.W. McGowan et al., "Light force cooling, focusing, and nanometer–scale deposition of aluminum atoms", opt. Lett. 20 (1995), pp. 2535–2537.

E.L. Raab et al., "Trapping of Neutral Sodium Atoms with Radiation Pressure", Phys. Rev. Let. 59 (1987), pp. 2631–2634.

W.Z. Zhae et al., "A computer–based digital feedback control of frequency drift of multiple lasers", Rev. Sci. Instrum. 69 (1998), pp. 3737–3740.

Tamotsu Inaba, "A Selection of Practical Analog Circuits," CQ Publishing Co., p. 291.

Tamotsu Inaba, "A Selection of Practical Analog Circuits," CQ Publishing Co., p. 291.

* cited by examiner

*Primary Examiner*—John R. Lee
*Assistant Examiner*—James P. Hughes

(57) ABSTRACT

An atomic beam control apparatus controls a position of an atomic beam that passes through a multi-pole magnetic field by irradiating the atomic beam with a light beam. The apparatus includes a probe light generator to generate probe light to detect a position of the atomic beam, a light sensor to receive the probe light, and a current control section to control a current flowing in multi-pole magnetic field generating electrodes controlling the position of the atomic beam. The light beam irradiates the atomic beam so that the atomic beam interacts with both the light beam and the magnetic field, and the position of the atomic beam is controlled by controlling currents fed to the multiple-pole magnetic field generating electrodes based on output values of the light sensor receiving the probe light.

13 Claims, 9 Drawing Sheets

ATOMIC BEAM CONTROL APPARATUS AND METHOD

CROSS REFERENCE TO RELATED APPLICATION

This application claims priority Japanese Patent Application No. 2000-398289, filed Dec. 27, 2000 in Japan, the contents of which are incorporated herein by reference.

BACKGROUND OF THE INVENTION

1. Field of the Invention

The present invention relates to an atomic beam control apparatus and method, especially an apparatus and method to control the position of an atomic beam irradiated with a light beam while passing through a multiple-pole magnetic field.

When an atomic beam is irradiated with appropriately adjusted laser light, the atoms experience a scattering force derived from the recoil which is caused in the process of spontaneous emission of light (photon) after having absorbed the laser light, or a dipole force that is produced as the spatial nonuniformity of light intensity acts upon atoms is generated.

By exerting the force caused by these effects on the atoms, it is possible to control the motion of these atoms. Lithographic technology using an atomic beam is widely known as an example of an application of this technology (hereinafter the lithographic technology is referred to as atomic lithography). Successes have been reported in forming atomic structures with a line width as fine as not more than 100 nm, which is a level exceeding the limits of conventional optical lithography on silicon substrates. Atoms such as Na (refer to V. Natsarajan et al., Phys. Rev. A53 (1996), pp. 4381–4385), Cr (refer to W. R. Anderson et al., Phys. Rev. A59 (1999), pp. 2476–2485), and Al (refer to R. W. McGowan et al., Opt. Lett. 20 (1995), pp. 2535–2537 are reported.) are reported to form such atomic structures.

2. Description of the Related Art

In the reports with the aforementioned references, attempts to produce an atomic structure directly on a substrate with a precision level less than light wavelength have been ongoing, using an atomic beam and a standing wave caused by the interference of light. In the atomic lithography that has so far been developed, however, the control of the patterning position on a substrate and the spatial positioning of an atomic beam by manipulating the atomic beam have not been attempted.

The conventional atomic lithography process can produce patterns only at the intersection (one point) of an atomic beam as the atom source and a substrate that is a pattern-forming surface. For this reason, the space for producing patterns, which the conventional atomic beam-based lithography process can draw, is limited.

FIG. 9 is a diagram for explaining the operating principle of the magneto-optical trap for atoms. The magneto-optical trap is well known in literature, such as E. L. Raab et al., Phys. Rev. Lett. 59 (1987), pp.2631–2634.

FIG. 9 shows the state where the energy level of atoms is subjected to Zeeman effect in a B-field (B=b z, where b is a constant) applied in the Z direction. In the interest of simplicity, a state where the ground state is J=0, and the excited state is J=1 is shown in the figure. In this state, $\sigma^+$-polarized (hereinafter referred to as positively circularly-polarized) light is applied in the +z direction, while$\sigma^-$- polarized (hereinafter referred to as negatively circularly-polarized) light is applied in the −z direction, with the light frequencies of both detuned slightly (by a few~dozens of MHz) to the negative side from the resonant frequency between the ground state and the excited state of the atoms.

In the z<0 region, where the transition frequency toward (S=0, ms=0 S=1, ms=1) is nearer to the laser frequency than the transition frequency toward (S=0, ms=0 S=1, ms=1), the atoms absorb the positively circularly-polarized light more than the negatively circularly-polarized light, and receive a scattering force in the +z direction. In the z>0 region, on the contrary, the atoms receive a scattering force in the −z direction. As a result, the atoms receiving a force toward z=0 at any position z are guided to the axis of z=0, and the movement of the atoms in the z direction is suppr essed by the effect of laser cooling.

SUMMARY OF THE INVENTION

It is an aspect of the present invention to provide an atomic-beam position control apparatus and method for two-dimensionally moving and stabilizing the pattern-forming position of atoms on a substrate to a desired position by creating an atomic beam which has characteristics suitable as an atomic source for atomic lithography technology and automatically controlling the spatial position of this atomic beam. Further, the present invention realizes the spatial positioning of the pattern-forming position of the atoms on the substrate and the expansion of the pattern-forming area.

According to an aspect of the present invention, there is provided a target position is set by automatically controlling the position of an atomic beam two-dimensionally using the aforementioned operating principle.

According to an aspect of the present invention, there is provided a probe light generating section for generating probe light to detect the position of the atomic beam, a light sensor for receiving the probe light, and a current control section for controlling currents flowing in multiple-pole magnetic field generating electrodes for controlling the position of the atomic beam on the basis of the output values of the light sensor in an atomic-beam control apparatus. Thus, the atomic beam control apparatus of the present invention controls the position of the atomic beam by forming a two-dimensional magneto-optical trap by irradiating the atomic beam passing through the multiple-pole magnetic field with a light beam. Further, the present invention also makes it possible to select the isotope in an atomic beam, make an atomic beam more collimated and denser, and control the spatial position of the atoms in the atomic beam.

The aspects, advantages, and features of the present invention will be more clearly understood by referencing the following detailed disclosure and the accompanying drawings.

BRIEF DESCRIPTION OF THE DRAWINGS

These and/or other aspects and/or advantages of the invention will become apparent and more readily appreciated from the following description of the aspects of the present invention, taken in conjunction with the accompanying drawings of which.

DETAILED DESCRIPTION OF THE PREFERRED EMBODIMENTS

Figure 1:
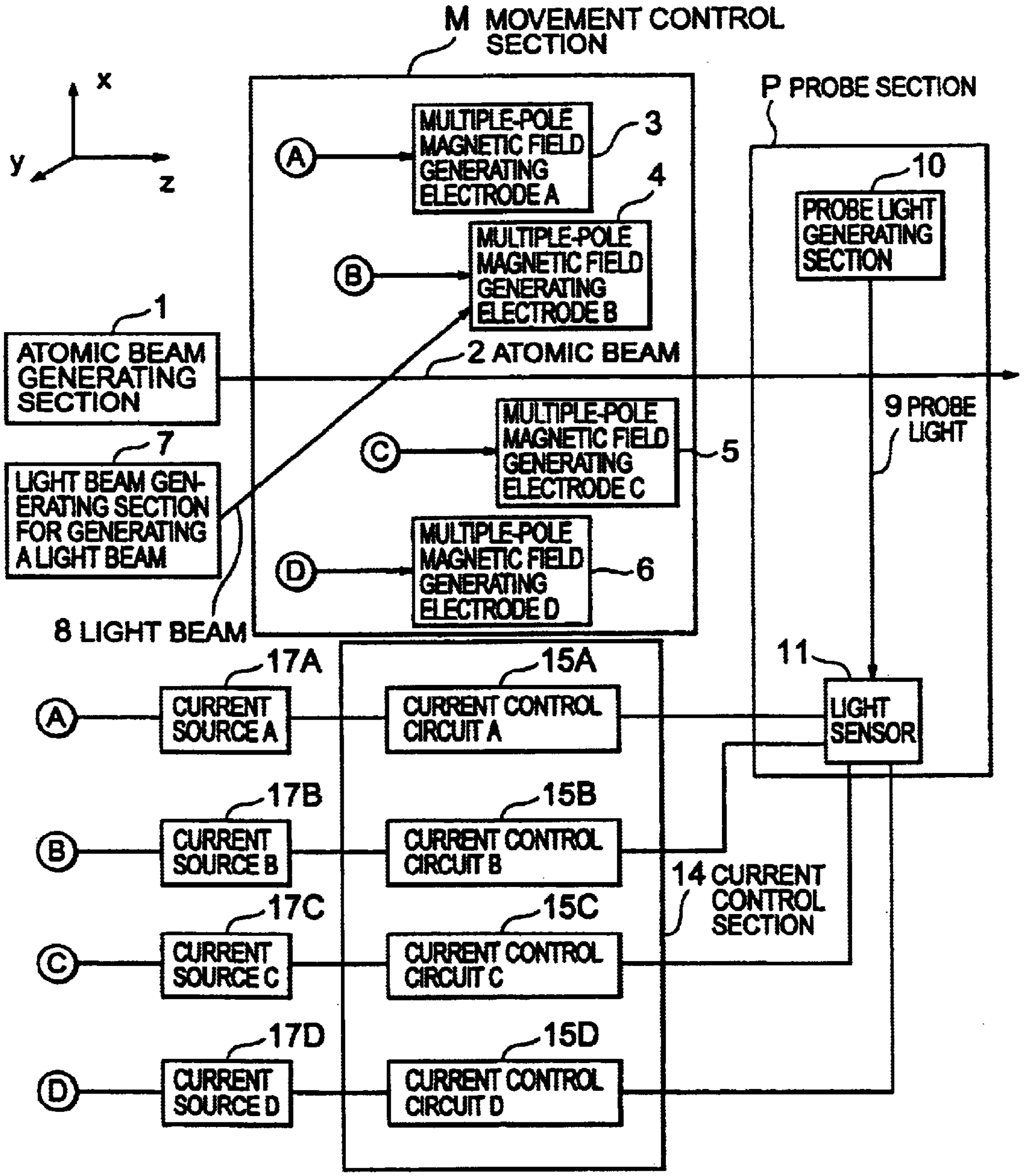
FIG. 1 is a diagram showing embodiment 1 of the present invention.

FIG. 1 shows embodiment 1 of the present invention, which is a theoretical embodiment. The present invention can be applied to a magnetic field produced by a multiple-pole magnetic field, or more than quadrupole magnetic field. The following description deals with the quadrupole magnetic field as a typical example. The directions of the x, y and z axes are defined as shown in the figures.

In FIG. 1, reference numeral 1 refers to an atomic beam generating section for generating an atomic beam. Numeral 2 refers to an atomic beam. Symbol M refers to a movement control section for controlling the position of the atomic beam.

In the movement control section M, numerals 3, 4, 5 and 6 refer to a multiple-pole magnetic field generating electrode A, a multiple-pole magnetic field generating electrode B, a multiple-pole magnetic field generating electrode C and a multiple-pole magnetic field generating electrode D, respectively, all forming a multiple-pole magnetic field. (In FIG. 1, four multiple-pole magnetic field generating electrodes form a quadrupole magnetic pole. The multiple-pole magnetic field generating electrodes, however, are not limited to four, but may be such that for forming a quadrupole or more multiple-pole magnetic filed, i.e., six such electrodes forming a hexapole magnetic field.) Numeral 7 refers to a light beam generating section for generating a light beam (laser beam) 8 for guiding the atomic beam 2 to a target position. The light beam irradiates the atomic beam 2 passing through the multiple-pole magnetic field to cause interaction with the atoms, and in conjunction with the magnetic field guides the atomic beam 2 to a target position.

Symbol P refers to a probe section for generating and detecting probe light. In the probe section, numeral 9 refers to a probe light for detecting the spatial position of the atomic beam 2 in the x and y directions. Numeral 10 refers to a probe light generating section for generating the probe light 9. Numeral 11 refers to a light sensor that receives the probe light 9 which interacts with the atomic beam 2.

Numeral 14 refers to a current control section for calculating and generating a control current that is fed to the multiple-pole magnetic pole generating electrodes to control the position of the atomic beam to a desired position. Numeral 15A refers to a current control circuit A for calculating and generating a control current to be fed to the multiple-pole magnetic field generating electrode A. Numeral 15B refers to a current control circuit B for calculating and generating a control current to be fed to the multiple-pole magnetic field generating electrode B. Numeral 15C refers to a current control circuit C for calculating and generating a control current to be fed to the multiple-pole magnetic field generating electrode C. Numeral 15D refers to a current control circuit D for calculating and generating a control current to be fed to the multiple-pole magnetic field generating electrode D.

Numeral 17A refers to a current source A for supplying current to the multiple-pole magnetic field generating electrode A. Numeral 17B refers to a current source B for supplying current to the multiple-pole magnetic field generating electrode B. Numeral 17C refers to a current source C for supplying current to the multiple-pole magnetic field generating electrode C. Numeral 17D refers to a current source D for supplying current to the multiple-pole magnetic field generating electrode D.

Now, the operation of the embodiment 1 of the present invention shown in FIG. 1 will be described in the following.

In the atomic beam generating section 1, the atomic beam 2 is generated. The atomic beam 2 passes through a multiple-pole magnetic field formed with the multiple-pole magnetic field generating electrodes A, B, C and D in which currents flow. On the other hand, in the light beam generating section 7, the light beam 8 is generated. As the light beam 8 is applied to the atomic beam 2, a two-dimensional (x and y directions) magneto-optical trap is formed where both the light beam 8 and the quadrupole magnetic field interact with the atoms, so that the interaction controls the aforementioned atom movement of the atoms in the x and y directions. Thus, the atoms are subjected to movement control so that the atoms are guided on the B=0 axis of the quadrupole magnetic field, thereby the position of the atomic beam 2 is shifted in the direction of magnetic flux density B=0 (B=0 axis), stabilized on the B=0 axis, and then output.

Now, the light probe section P will be described in the following. The probe light 9 is applied to the atomic beam 2 from the almost vertical direction (x- or y-direction). The probe light 9, after an interaction with the atomic beam 2, is received by the light sensor 11 to measure the absorption of the probe light 9 by the atoms. The more is the spatial overlapping between the atomic beam 2 and the probe light 9 during the interaction, the lower the intensity at which the light sensor 11 receives the probe light 9. From this fact, the relative positions of the probe light 9 and the atomic beam 2 can be determined.

Next the current control section will be described. The output of the light sensor 11 is entered into the current control circuit A, the current control circuit B, the current control circuit C and the current control circuit D. The current control circuit A, the current control circuit B, the current control circuit C and the current control circuit D calculate control current values to be given to the currents that are flowing in the current source A, the current source B, the current source C and the current source D in accordance with the output of the light sensor 11 and output the resulting currents so that the position of the atomic beam 2 reaches the target position.

In this way, currents necessary for causing the multiple-pole magnetic field generating electrode A, the multiple-pole magnetic field generating electrode B, the multiple-pole magnetic field generating electrode C and the multiple-pole magnetic field generating electrode D to generate a multiple-pole magnetic field suitable for achieving desired movement control flow from the current source A, the current source B, the current source C and the current source D, and as a result, the atomic beam 2 is guided and controlled to the target position on the x-y plane in the movement control section M.

As the operating principle described referring to FIG. 1, the atomic-beam irradiation area on the substrate can be expanded with a single atomic beam by two-dimensional control (in x and y directions) of the movement of the atomic beam 2 with the magneto-optical interaction, which is realized according to the present invention. As a result, atomic-beam pattern forming over a wide range of the substrate, that has been considered impossible up to this time, is made capable. Furthermore, the atomic-beam irradiating position can be optimized and stabilized using the same principle. Moreover, the present invention can collimate the atomic beam as an atom source, which is caused by the laser cooling effect, with higher performance, efficiency and precision than could have achieved with mechanical means, and can accomplish a higher-density atomic beam. This atom source having all these advantages can be effectively used as an atom source for atomic lithography. If a narrower-spectrum laser beam is used as the light beam 8 a certain isotope in the atomic beam can be selected with appropriately controlling the frequency of the laser beam, and the movement of the selected isotope can be controlled, so that the isotope selection can be realized.

Figure 2:
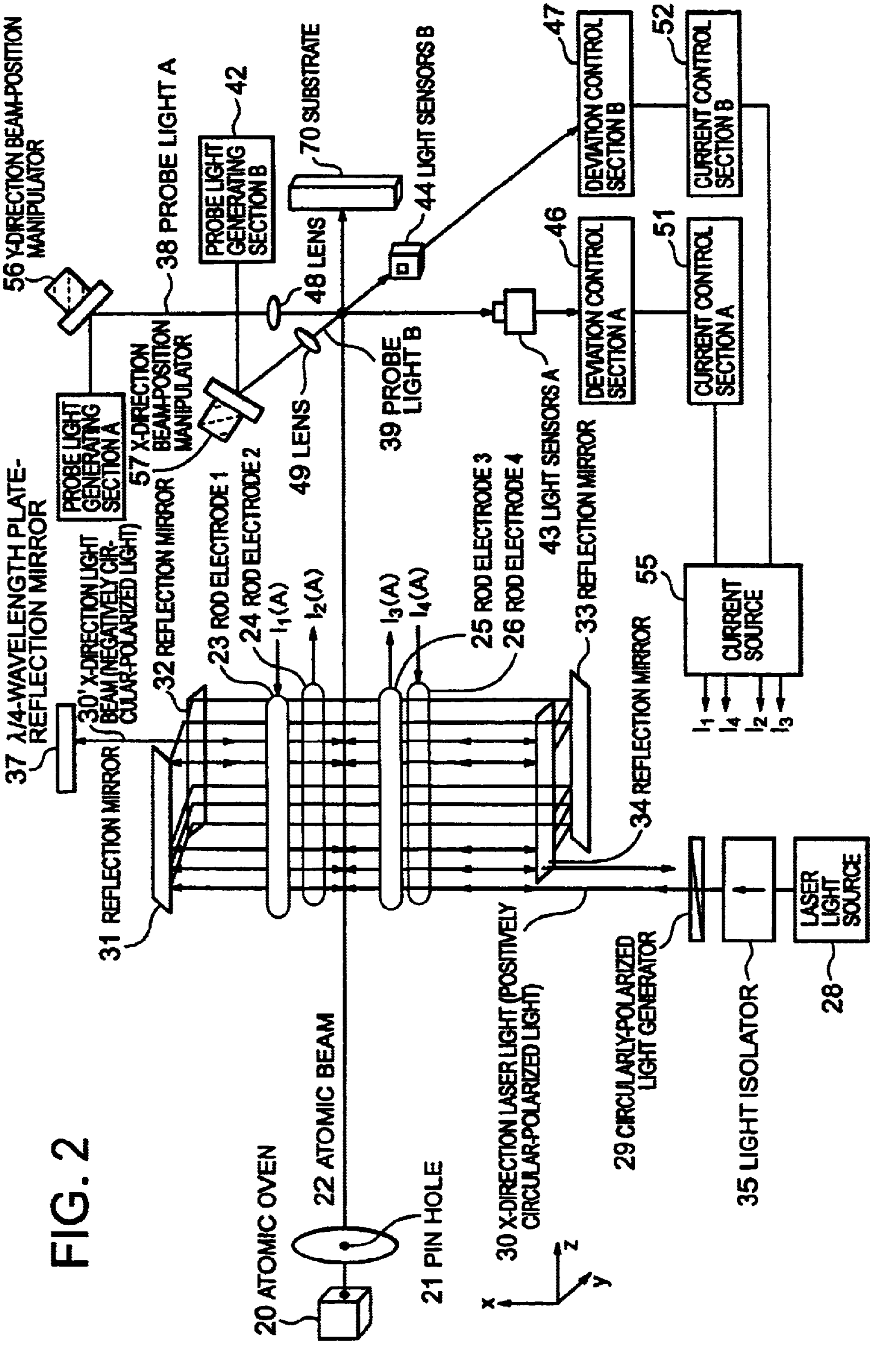
FIG. 2 is a diagram showing embodiment 2 of the present invention.

FIG. 2 shows embodiment 2 of the present invention where the position of an atomic beam is controlled by a quadrupole magnetic field and a light beam. In the interests of simplicity, FIG. 2 shows only a configuration involving the x-axis direction control in a section corresponding to the movement control section M in FIG. 1. An actual apparatus has a similar equipment configuration where the incident direction of a light beam is set to the y-axis direction for the y-axis direction control.

In FIG. 2, numeral 20 refers to an atomic oven, 21 refers to a pin hole, 22 refers to an atomic beam, 23 refers to a rod electrode 1, 24 refers to a rod electrode 2, 25 refers to a rod electrode 3, 26 refers to a rod electrode 4 each electrode is adapted to allow currents $I_1$, $I_2$, $I_3$ and 14 respectively, to flow in the directions shown in the figure, (each rod electrode is a quadrupole magnetic field generating electrode.) Based on the assumption that all the distances L between the rod electrode 1—the rod electrode 2 between the rod electrode 2—the rod electrode 4 between the rod electrode 4—the rod electrode 3 and between the rod electrode 3—the rode electrode 1 are equal, the original atomic-beam axis is set on an axis that is at an equal distance ($L/2^{1/2}$) from the four rod electrodes. Numeral 28 refers to a laser light source, and 29 refers to a circularly-polarized light generator that uses a λ/4-wavelength plate, when linearly polarized laser light is used as a light source, to convert linearly polarized light into positively circularly-polarized light. When positively circularly-polarized light can be obtained from the laser light source 28 the circularly-polarized light generator 29 is not needed. Numerals 31, 32, 33 and 34 refer to reflection mirrors. Numeral 35 refers to optical isolator of a type having an isolation of not less than 60 dB. Numeral 37 refers to a λ/4-wavelength plate-reflection mirror that is an optical component having both a function of converting positively circularly-polarized light into negatively circularly-polarized light and a reflection mirror function, as the a λ/4-wavelength plate-reflection mirror 37 for example a λ/4-wavelength plate whose reverse surface is high-reflection coated is used. By interacting both the quadrupole magnetic field and the laser light, a two-dimensional magneto-optical trap is formed to control the movement of atoms in the x and y directions.

Numeral 38 refers to probe light A that travels in the x-axis direction to detect the position of the atomic beam 22 in the y-axis direction. Numeral 39 refers to probe light B that travels in the y-axis direction to detect the position of the atomic beam 22 in the x-axis direction. Numerals 41 and 42 refer to a probe light generating sections A and B for generating the probe light A (38) and the probe light B (39), respectively. Numerals 43 and 44 refer to light sensors A and B for receiving the probe light A (38) and the probe light B (39) to generate currents in accordance with light intensities.

Numeral 46 refers to a deviation control section A for generating a deviation signal for inputting into the current control section A (51) based on the output value of the light sensor A (43). Numeral 47 refers to a deviation control section B for generating a deviation signal for inputting into the current control section B (52) based on the output value of the light sensor B (44).

Numeral 51 refers to a current control section A for generating a control signal for controlling the y-direction movement of the atomic beam in accordance with the deviation signal generated by the deviation control section A (46). Numeral 52 refers to a current control section B for generating a control signal for controlling the x-direction movement of the atomic beam in accordance with the deviation signal generated by the deviation control section B (47).

Numeral 55 refers to a current source for generating a current 11 flowing into the rod electrode 1 (23), a current 12 flowing into the rod electrode 2 (24), a current 13 flowing into the rod electrode 3 (25) and a current 14 flowing into the rod electrode 4 (26).

Numeral 56 refers to a y-direction beam-position manipulator for roughly or precisely manipulating the beam position in the y direction of the probe light A (38). Numeral 57 refers to an x-direction beam-position manipulator for roughly or precisely manipulating the beam position in the x direction of the probe light B (39).

Now, FIG. 3 will be described before describing the operation of the configuration shown in FIG. 2.

Figure 3:
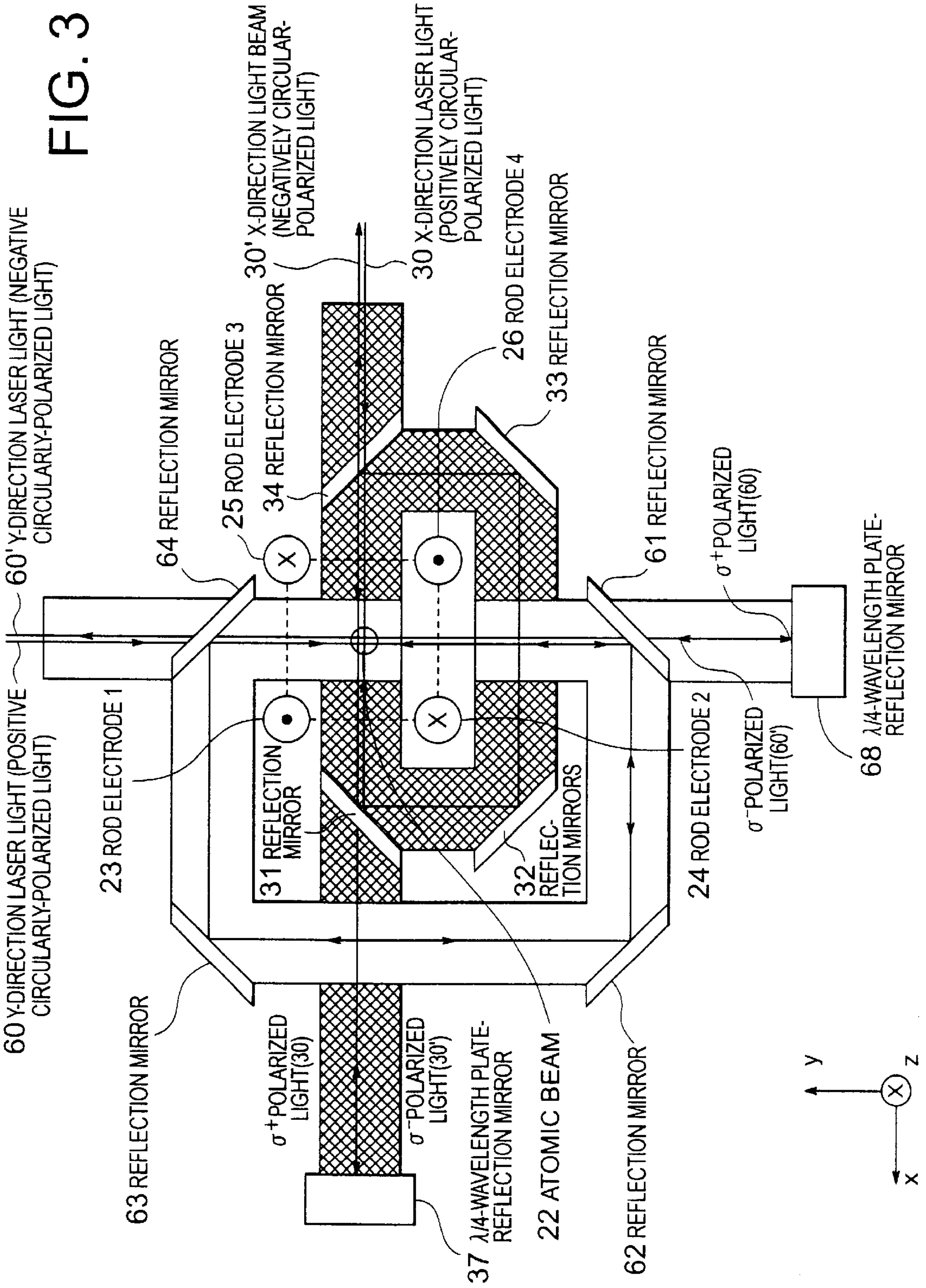
FIG. 3 is a cross-sectional view of a portion around rod electrodes of embodiment 2 of the present invention.

FIG. 3 is a cross-sectional view on the x-y plane of a portion of the movement control section (two-dimensional magneto-optical trap section) shown in FIG. 2 where there are rod electrodes. In FIG. 3, the same reference numerals as used in FIG. 2 denote the same parts. FIG. 3 also shows a light path of a laser light for controlling the atomic beam 22 in the y-axis direction.

In FIG. 3, numeral 22 refers to an atomic beam that travels in the z-axis direction (in the direction vertical from the page surface to reverse in the figure). Numerals 23, 24, 25 and 26 refer to a rod electrode 1 a rod electrode 2 a rod electrode 3 and a rod electrode 4 respectively. Numeral 30 refers to an x-direction laser light (positively circularly-polarized light) that is a positive-direction light beam on the x-axis. 30' refers to an x-direction light beam (negatively circularly-polarized light) that is a negative-direction light beam on the x-axis. Numerals 31, 32, 33 and 34 refer to reflection mirrors. Numeral 37 refers to a λ/4-wavelength plate-reflection mirror.

Numeral 61, 62, 63 and 64 refer to reflection mirrors disposed in the light path of a laser light for controlling the atomic beam 22 in the y-axis direction. Numeral 68 refers to a λ/4-wavelength plate-reflection mirror. Numeral 60 refers to a y-direction laser light (positively circularly-polarized light) that is a negative-direction light beam on the y-axis. Numeral 60' refers to a y-direction laser light (negatively circularly-polarized light) that is a positive-direction light beam on the y-axis. The negatively circularly-polarized light of the y-direction laser light is produced as the positively circularly-polarized light beam 60 is incident on the λ/4-wavelength plate-reflection mirror 68 and reflected therefrom.

Now the operation of the embodiment 2 of the present invention will be described, referring to FIGS. 2 and 3.

A heater-evaporator, such as the Knudsen cell, is used as an atomic oven 20 in which atoms, such as Cr and Ar, are heated until vapor pressure rises to not lower than $10^{-1}$ Torr, and an atomic beam 22 is formed only by those atoms which emanates through a pinhole provided on the oven and pass through another pinhole 21 The diameter of the two pinholes and the distance between the two pinholes are adjusted so that the spread angle of the atomic beam 22 becomes not more than 10 mrad. The atomic beam 22 passes through a two-dimensional magneto-optical trap (corresponding to the movement control section M in FIG. 1) comprising a quadrupole magnetic field and a laser beam, where the movement of the atomic beam 22 in the x and y directions is controlled, and reaches a substrate 70 The energy levels of atoms in the atomic beam 22 are shifted by the Zeeman effect as they pass through the quadrupole magnetic field.

The oscillation frequency of a linearly polarized laser beam generated by the laser light source 28 on the other hand, is negatively detuned from the resonance frequency of transition, which can be subjected to the laser cooling of the atoms being controlled, by about half of the natural line width of the transition. Furthermore, the oscillation frequency of the laser light source 28 should preferably be stabilized using a method shown in literature (W. Z. Zhao et al., Rev. Sci. Instrum. 69 (1998), pp. 3737~3740, for example). In the case of Cr atoms, for example, $7S_3$_$7P_4$ (425 nm) is selected as a transition that can be subjected to laser cooling. Since the natural line width of this transition is approximately 5 MHz, the oscillation frequency of the laser light source 28 is negatively detuned from the resonance frequency of the transition by 2~3 MHz. As the laser light source 28 a narrow-spectrum light source whose oscillation spectral line width is not more than several MHz is used. After that, this laser light, after passing through an optical isolator 35 (of an isolation of not less than 60 dB) and a circularly-polarized light generator 29 becomes a positively circularly-polarized light and falls on the reflection mirror 31 then on the reflection mirrors 32, 33 and 34 in that order for reflection. The laser light then falls again on the reflection mirror 31 and on the reflection mirrors 32, 33 and 34 traveling helically while repeating reflection, and falls on the λ4-wavelength plate-reflection mirror 37 When reflected on the λ4-wavelength plate-reflection mirror 37 the laser light becomes a negatively circularly-polarized light, returning on the light path. The negatively circularly-polarized light, while returning again on the same light path, repeats reflection on the reflection mirrors 34, 33, 32, 31 and 34 in that order, and travels helically, returning to the laser light source 28 Either positive or negatively circularly-polarized light is disposed in such a manner as to interact with the atomic beam in the 90-degree direction with respect to the original atomic beam axis. The light intensity of the positively circularly-polarized light (30) and the negatively circularly-polarized light (30') should preferably be almost a saturated light intensity with respect to the light transition used in movement control for the used atom. For example, in the case of the aforementioned Cr atoms, since the saturated light intensity with respect to the light transition is 8.5 mW/cm$^2$ the output of the laser light 28 is controlled so that the light intensity of the positively circularly-polarized light (30) and the negatively circularly-polarized light (30') does not exceed 10 mW/cm$^2$ when interacting with the atomic beam.

The atomic beam 22 in a multiple-pole magnetic field is excited more by the positively circularly-polarized laser light than by the negatively circularly-polarized laser light in the $x<0$ region. As a result, the atomic beam 22 receives a force in the positive direction (direction toward the minimum magnetic field B) on the x-axis, and the atomic position is shifted in that direction. In the $x>0$ region, the atomic beam 22 absorbs more of the negatively circularly-polarized laser light produced after reflected by the λ/4-wavelength plate-reflection mirror 37 with the result that the atoms receive a force in the negative direction (direction toward the minimum magnetic field) on the x-axis, and the atomic beam is shifted in that direction. In either the $x>0$ or $x<0$ region, moreover, the laser cooling effect acts on the atoms. Similarly, the atoms in the $y>0$ region receive a force in the negative direction on the y-axis by the effect of the light beam in the negative direction on the y-axis (positively circularly-polarized light 60), and the atoms in the $y<0$ region receive a force in the positive direction on the y-axis by the effect of the light beam in the positive direction on the y-axis (negatively circularly-polarized light 60'). As a result, the atomic beam 22 traveling in the z direction receives a strong restoring force and damping force toward coordinate ($x_0$, $y_0$) where B=0 by the effects of the positively and negatively circularly-polarized light (30, 30', 60, 60') as well as the quadrupole magnetic field, and the movement of the atomic beam 22 in the x and y directions is suppressed and guided to a z-direction axis (output beam axis) passing ($x_0$, $y_0$). The output atomic beam is fully collimated along this output beam axis by the laser cooling effect and resulted into a high-density output atomic beam having a compressed beam diameter. In addition, even when an atomic source consisting of several isotopes is used, as a spectrally narrowed light source is used as the laser light source 28 the aforementioned movement of a specific isotopic component selected from the isotopes can be controlled by appropriately tuning the frequency of the light source. When Cr atoms having four isotopes of the atomic mass numbers of 50, 52, 53 and 54 are used, for example, the aforementioned movement control can be achieved only for selected $^{52}$Cr having the maximum abundance ratio (84%) by tuning the oscillation frequency of the laser light source 28 based on the $^7S_3$–$^7P_4$ transition of $^{52}$Cr. By shifting the output beam axis (axis of B=0) from the original atomic beam axis, an atomic beam of only the selected isotope can be shifted along to the out beam axis. So an isotope-selected output beam can be obtained. Thus, atomic pattern forming is made possible using an atomic source comprising a single isotope.

The size of this control section (corresponding to the movement control section M in FIG. 1) is determined in the following way. In this control section, $I_0$ and L (distance between rod electrodes) values are determined by feeding a current of an equal current value ($I_0$) to the rod electrodes 1–4 so that the field gradient in the quadrupole magnetic field becomes approximately 20 G/cm. Since the B=0 axis of the quadrupole magnetic field agrees with the original atomic beam axis, the atomic beam 22 is collimated on the original axis and the beam diameter is compressed, as the beam 22 passes through this control section. At this time, the interaction length (the length of the reflection mirrors (31~34, 61~64), the length of the rod electrodes (23~26), the beam diameter of the laser light (30,30', 60 and 60')) is maintained to a degree sufficient to control the atoms of an amount, which is so as to the spread angle of the beam spread of the atoms incident in this control section of not less than 95% becomes to a level of not more than 1 mrad by the movement control.

In the practical application of the two-dimensional magneto-optical trap that corresponds to the movement control section, it is desired that the behavior of control is monitored in advance, and the field gradient, the amount of frequency detuning of the laser light 28 the intensities of the laser light (30, 30', 60 and 60'), and the length of interaction are adjusted respectively to their optimum values so that operating performance enough to the user's intended purpose can be accomplished.

The light sensor A (43) outputs a current value in accordance with the intensity of the transmitted light using a photodiode, for example after the probe light A (38) has interacted with the atomic beam. The frequencies of the probe light (both A and B) are set in advance to the resonance frequency of atomic transition used for carrying out movement control with the two-dimensional magneto-optical trap. The probe light is produced using a spectrally-narrowed light source having a spectral width of not more than several MHz that oscillates in a single longitudinal and transverse. Furthermore, the intensity of the probe light is set to a level sufficiently lower than the saturated intensity of the atomic transition (not more than about 1/10 of the saturated intensity) at the interaction point with the atomic beam. When the aforementioned Cr atoms, for example, are used, the intensity of the probe light is set in advance to not more than 1 $mW/cm^2$ at the interaction point. The probe light is adjusted using lenses (48 and 49) and other optical components so that the probe light has a desired beam spot size at the interaction point with the atomic beam. The beam diameter of the probe light, which limits the position sensing and control accuracy of the atomic beam, should be appropriately reduced when carrying out a higher-precision control. The beam diameter of the probe light can be reduced down to the diffraction limit of light.

The deviation control section A (46) converts the current value output by the light sensor A (43) into a voltage value, compares the voltage value with the threshold value for setting the atomic beam at the target position in the y-axis direction, and calculates a deviation indicating how much the atomic beam 22 is shifted from the target position in the y-axis direction.

Similarly, the light sensor B (44) outputs a current value in accordance with the intensity of the transmitted light after the probe light B (39) has interacted with the atomic beam as measured by a photodiode. The deviation control section B (47) converts the current value output by the light sensor B (44) into a voltage value, compares the voltage value with the threshold value for setting the atomic beam at the target position in the x-axis direction, and calculates a deviation indicating how much the atomic beam 22 is shifted from the target position in the x-axis direction.

The current control section A (51) calculates control current values to input to the rod electrode 1 (23), the rod electrode 2 (24), the rod electrode 3 (25) and the rod electrode 4 (26) from the y-direction deviation signal output by the deviation control section A (46) for y-direction control, and generates the current. The current control section B (52) calculates control current values to input to the rod electrode 1 (23), the rod electrode 2 (24), the rod electrode 3 (25) and the rod electrode 4 (26) from the x-direction deviation signal output by the deviation control section B (47) for x-direction control, and generates the current. The current source 55 adds up the control current values for the x-direction and y-direction control calculated by the current control section A (51) and the current control section B (52), and adds the currents $dI_1$, $dI_2$, $dI_3$ and $dI_4$ to the currents $I_1$~$I_4$, respectively, and feeds the added currents to the rod electrode 1 (23), the rod electrode 2 (24), the rod electrode 3 (25) and the rod electrode 4 (26) so that a quadrupole magnetic field for moving the atomic beam to a position determined by the probe light A and the probe light B is formed.

The spatial profile of the quadrupole magnetic field changes by adding (or subtracting) the aforementioned control current values to (or from) the four rod-electrode current values as correction values. The B=0 of the quadrupole magnetic field is spatially shifted in accordance with an axis (z-direction) passing a position (x0, y0) on the x- and y-planes determined by the probe light A and the probe light B. The position of the atomic beam 22 follows the shift of the B=0 axis of the quadrupole magnetic field, thus position of the atomic beam 22 can be moved two-dimensionally.

Figures 4A, 4B, 4C:
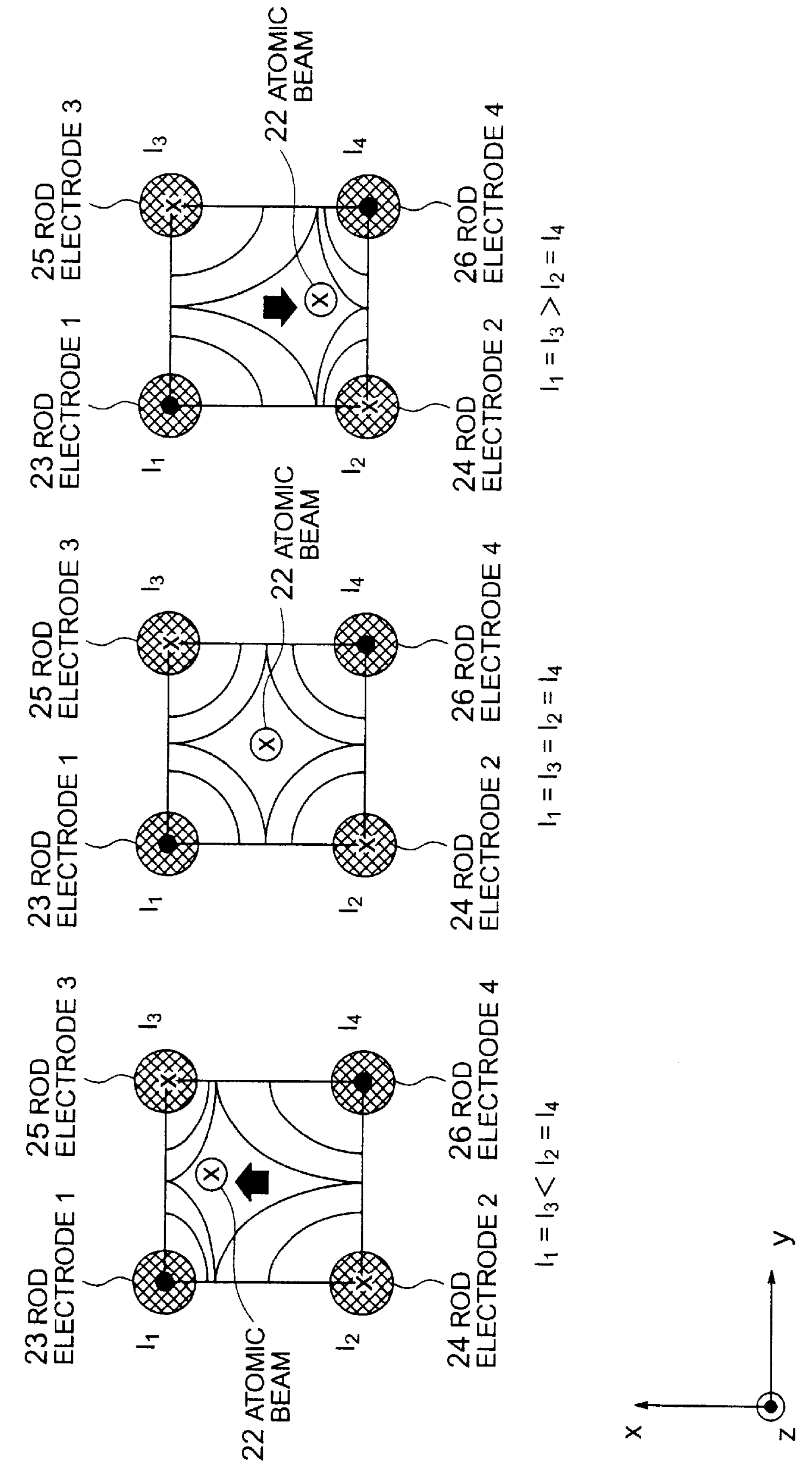
FIG. 4A is a diagram of assistance in explaining a method for controlling an atomic beam in the case where $I_1=I_3<I_2=I_4$, according to an aspect of the present invention.
FIG. 4B is a diagram of assistance in explaining a method for controlling an atomic beam in the case where $I_1=I_3=I_2=I_4$, according to an aspect of the present invention.
FIG. 4C is a diagram of assistance in explaining a method for controlling an atomic beam in the case where $I_1=I_3>I_2=I_4$, according to an aspect of the present invention.

FIGS. 4A, B and C explain atomic beam control according to the present invention, which shows the control of the atomic beam in the y direction. In FIGS. 4A, B, and C, the z-axis is in the direction vertical from the page surface to reverse in the figure.

In FIGS. 4A, B, and C, numeral 23 refers to a rod electrode 1, 24 refers to a rod electrode 2, 25 refers to a rod electrode 3 and 26 refers to a rod electrode 4. Currents $I_1$, and $I_4$ flow in the negative z-axis direction (direction outward from the page surface), and current $I_2$ and $I_3$ flow in the positive z-axis direction (direction from the page surface to t reverse.). When control is carried out only in the y direction, $I_1$, $=I_3$ and $I_2=I_4$.

FIG. 4A shows the case where $I1=I_3<I_2=I_4$ FIG. 4B shows the case where $I_1=I_3=I_2=I_4$FIG. 4C shows the case where $I_1$,$=I_3>I_2=I_4$.

When the relationship among the currents flowing in the rod electrodes is $I_1$, $=I_3<I_2=I_4$as shown in FIG. 4A, the axis of the minimum magnetic field (B=0) is shifted in the y>0 region, as shown in FIG. 4A, and the atomic beam is stabilized at the position of the minimum magnetic field (B=0) in the y>0 region, as shown in FIG. 4A.

When the relationship among the currents flowing in the rod electrodes is $I_1=I_3=I_2=I_4$as shown in FIG. 4B, the minimum magnetic field is produced at the position (on the z-axis) of the origin of the x- and y-axes, and the atomic beam is stabilized at the position of the minimum magnetic field produced at the position (on the z-axis) of the origin of the x- and y-axes, as shown in FIG. 4B.

When the relationship among the currents flowing in the rod electrodes is $I_1=I_3>I_2=I_4$as shown in FIG. 4C, the axis of the minimum magnetic field (B=0) is shifted in the y<0 region, as shown in FIG. 4C, and the atomic beam is stabilized at the position of the minimum magnetic field (B=0) in the y<0 region, as shown in FIG. 4C.

In FIGS. 4A, B, and C, description has been made only about the control in the y-axis direction on the assumption that $I_1=I_4$, and $I_2=I_3$. However, a control in the x-y plane is capable. The position of the atomic beam can be controlled by two-dimensionally guiding the atomic beam to a desired target position within a region where both the light and the magnetic field interact with the atoms in the x-y plane in FIGS. 4A, B, and C by calculating current values for the currents $I_1$, $I_2$,$I_3$, and $I_4$, caused with the deviations of the atomic beam in the x-axis and y-axis directions.

Figures 5A, 5B:
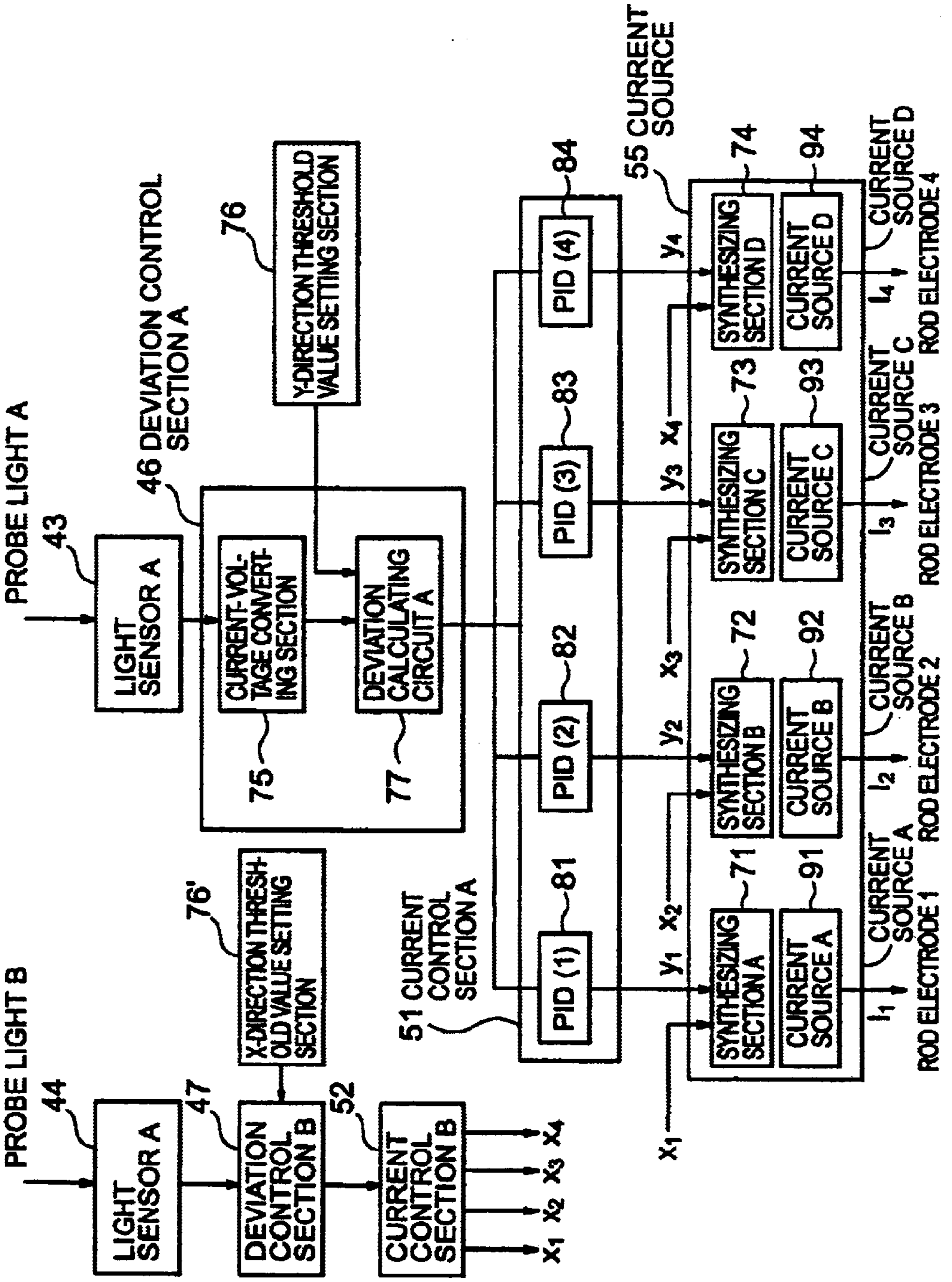
FIG. 5A is a diagram showing a deviation control circuit, a current control section and a current source on a side of probe light A, according to an aspect of the present invention.
FIG. 5B is a diagram showing a deviation control circuit, a current control section and a current source on a side of probe light B, according to an aspect of the present invention.

FIGS. 5A and B show a typical configuration of the deviation control section, the current control section and the current source in Embodiment 2 of the present invention. FIG. 5A shows the configuration for the y-direction control, and FIG. 5B shows the configuration for the x-direction control. In FIGS. 5A and 5B, the same components as in FIG. 2 are indicated by common numerals.

In FIG. 5A, numeral 43 refers to a light sensor A, 46 refers to a deviation control section A, 44 refers to a light sensor B, 47 refers to a deviation control section B, 51 refers to a current control section A, 52 refers to a current control section B, and 55 refers to a current source. As the light sensors 43 and 44 photodiodes or photomultipliers, for example, are used.

Numeral 75 refers to a current-voltage converting section A for converting an output current value from the light sensor A into a voltage value using an electrical circuit having an operational amplifier, etc. Numeral 76 refers to a y-direction threshold value setting section A for setting voltage threshold values S. The y-direction threshold value S is determined in accordance with the target position of the atomic beam. This threshold value is appropriately determined by the user of the apparatus in accordance with specific purposes. Numeral 77 refers to a deviation calculating circuit A for calculating the difference between the voltage value output by the current-voltage converting section 75 and the threshold voltage value. The voltage difference indicates how the present position of the atomic beam deviates from its target position.

In the current control section A (51), numeral 81 refers to a PID (1) that is a PID control circuit. The configuration and operating principle of the PID control circuit are well known, as described in literature, such as Tamotsu Inaba, "A Selection of Practical Analog Circuits," CQ Publishing Co., p. 291 The PID (1) is used for calculating control values for controlling the output current of the current source A (91) (same as the current source A (17A) in FIG. 1) in accordance with the output values of the deviation calculating circuit A 77 based on the preset parameters, and outputting the values. Numeral 82 refers to a PID (2) that is a PID control circuit for calculating control values for controlling the output current of the current source B (92) (same as the current source B (17B) in FIG. 1) in accordance with the output values of the deviation calculating circuit A 77 based on the preset parameters, and outputting the values. Numeral 83 refers to a PID (3) that is a PID control circuit for calculating control values for controlling the output current of the current source C (93) (same as the current source C (17C) in FIG. 1) in accordance with the output values of the deviation calculating circuit A 77 based on the preset parameters, and outputting the values. Numeral 84 refers to a PID (4) that is a PID control circuit for calculating control values for controlling the output current of the current source D (94) (same as the current source D (17D) in FIG. 1) in accordance with the output values of the deviation calculating circuit A 77 based on the preset parameters, and outputting the values.

Numerals 71, 72, 73 and 74 refer to a synthesizing section A, a synthesizing section B, a synthesizing section C and a synthesizing section D. The details of the synthesizing sections will be described later. Numerals 91, 92, 93 and 94 refer to a current source A, a current source B, a current source C and a current source D for feeding currents for forming a quadrupole magnetic field to the rod electrode 1 the rod electrode 2 the rod electrode 3 and the rod electrode 4.

In FIG. 5A, the deviation calculating circuit A (77) outputs a y-direction deviation Yd (t) of the atomic beam 22A from its target position at a detection time t. The PID (1) calculates a control value y, (t) for current to be fed to the rod electrode 1 to move the atomic beam 22 to a target value which causes Yd (t)=0 at the time t. The PID (2) calculates a control value $Y_2$ (t) for current to be fed to the rod electrode 2 to move the atomic beam 22 to a target value which causes Yd (t)=0 at the time t. The PID (3) calculates a control value $y_3$ (t) for current to be fed to the rod electrode 3 to move the atomic beam 22 to a target value which causes Yd (t)=0 at the time t. The PID (4) calculates a control value $y_4$ (t) for current to be fed to the rod electrode 4 to move the atomic beam 22 to a target value which causes Yd (t)=0 at the time t. Any of the PID control circuits PIDs (1)–(4) outputs a control voltage value given by the following equation with respect to the deviation input signal Yd (t) at a time t.

$$y_i(t) = K_i Y_d(t) + \alpha_i \frac{1}{T_i}\int Y_d(t)dt + \beta_i D_i \frac{d}{dt}(Yd(t)) \quad \text{(Eq. 1)}$$

where $K_i$ is a proportionality constant, $T_i$ is an integral time constant, $D_i$ is a differential time constant, $\alpha_i$ is an integral mixture ratio, $\beta_i$ is a differential mixture ratio, and i=1–4 corresponds to each of the PID control circuits.

The aforementioned constants are preset to a value with which the interaction length (length of the movement control section M), which is necessary for carrying out a desired atomic beam control, is shortest. In the actual control stage, the aforementioned constants should preferably be fine-adjusted to the intended purpose of this apparatus, taking into account the observation results of the control.

In FIG. 5B (b), numeral 44 refers to a light sensor B, 47 refers to a deviation control section B having the same configuration as that of the deviation control section A (46) in FIG. 5A, 76' refers to an x-direction threshold value setting section, and 52 refers to a current control section B for holding PID (1'), PID (2'), PID (3') and PID (4') for producing x-direction control signals ($x_1$ (t), $x_2$ (t), $x_3$ (t) and $x_4$ (t)) as in the case of the current control section A (51) (not shown).

In FIG. 5B, the deviation control section B (47) calculates an x-direction deviation Xd (t) at a detection time t, based on the output of the light sensor B (44). The current control section B (52) calculates control values $x_1$ (t), $x_2$ (t), $x_3$ (t) and $x_4$ (t) for currents to be fed to the rod electrode 1 the rod electrode 2 the rod electrode 3 and the rod electrode 4 in order to perform the x-direction control of the atoms so as to realize Xd (t)=0 by PID (1'), PID (2'), PID (3') and PID (4').

In FIG. 5A, the synthesizing sections A, B, C and D obtains control current values $dI_1$, $dI_2$ $dI_3$ and $dI_4$ by synthesizing (adding) $x_1$ (t) and $y_1$ (t), $x_2$ (t) and $y_2$ (t), $x_3$ (t) and $y_3$ and $x_4$(t) and $y_4$ (t) from the y-direction control values $y_1$ (t), $y_2$ (t), $y_3$ (t) and $y_4$ (t) produced in each PID in the current control section A (51), and the x-direction control values $x_1$ (t), $x_2$ (t), $x_3$ (t) and $x_4$ (t) produced by the current control section B (52). The current source A (91) adds the current ($dI_1$) determined based on the synthesized value (added value) of the synthesizing section A (71) to the current ($I_1$) that has been fed up to then, and feeds the sum to the rod electrode 1. The current source B (92) adds the current ($dI_2$) determined based on the synthesized value (added value) of the synthesizing section B (72) to the current (12) that has been fed up to then, and feeds the sum to the rod electrode 2 The current source C (93) adds the current ($dI_3$) determined based on the synthesized value (added value) of the synthesizing section C (73) to the current ($I_3$) that has been fed up to then, and feeds the sum to the rod electrode 3. The current source D (94) adds the current ($dI_4$) determined based on the synthesized value (added value) of the synthesizing section D (74) to the current ($I_4$) that has been fed up to then, and feeds the sum to the rod electrode 4.

Details of the deviation calculating circuit A, and the deviation calculating circuit B in FIG. 5A will be described later.

Figure 6:
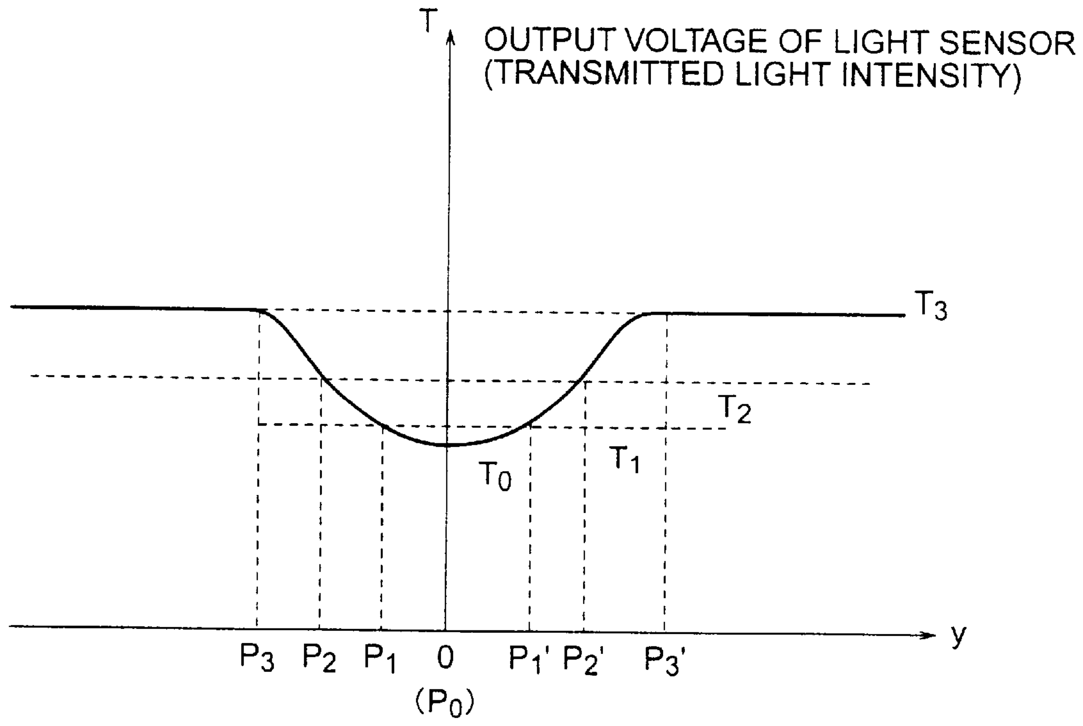
FIG. 6 is a diagram for explaining a method for detecting the position of an atomic beam, according to an aspect of the present invention.

FIG. 6 shows the output voltage (vertical axis) of a light sensor with respect to the probe light irradiation position (horizontal axis) in the y direction. Now, assume that the atomic beam travels along the original atomic beam axis (x=y=0), and the x component of the probe light irradiation position is kept at x=0 Also assume that the y-direction atomic beam diameter at the probe light irradiation position is $2|P_3|$. When the probe light irradiation position lies at $P_0$ (=0), $P_1$ and $P_2$ the output voltage values become $T_0$, $T_1$ and $T_2$, respectively.

Now, the principle of controlling the movement of the atomic beam position will be described, taking as an example the case where the position of the atomic beam 22 is moved from $y=P_0=0$ to $P_1$ on the x=0 axis.

In FIG. 5A and FIG. 6, the first light sensor output voltage is $T_0$. Next, a threshold value $S=T_1$ is set in the y-direction threshold value setting section 76 in FIG. 5A. In the deviation calculating circuit A 77 $Yd(t)=T_0-T_1$ is calculated, and the resulting voltage values are entered into the four PID control circuits (81~84) in the current section A 51. As a result, control currents are generated in the four PID control circuits (81~84) so that Yd (t)=0 and fed back to the four current sources for generating a quadrupole magnetic field. Thus, the spatial profile of the quadrupole magnetic field is changed by the application of these control currents. So the position of the atomic beam is controlled as the atomic beam is guided to the position where Yd (t)=0 that is, $y=P_1$ by this control mechanism, if appropriate values are selected and adopted in the PID control mechanism for parameters given in $$y_i(t) = K_i Y_d(t) + \alpha_i \frac{1}{T_i}\int Y_d(t)dt + \beta_i D_i \frac{d}{dt}(Yd(t)). \quad \text{(Eq. 2)}$$

By changing the threshold value S, it is possible to move and control the atomic beam to the position y, ($T_0<S<T_3$), $P_3<y<P_0$. In a range beyond this, as the probe light irradiation position is moved to a position other than y=0 using the y-direction beam-position manipulator 56 the aforementioned feedback mechanism is also operated to follow the movement, and thereby the atomic-beam position can be moved in accordance with the movement of the probe light while maintaining the relative position thereof (that corresponds to $P_1$ in the above example) with the probe light. In the process, the traveling speed of the probe light is slow enough to be followed by the aforementioned feedback mechanism. With this arrangement, the position of the atomic beam can be moved and stabilized at a desired position over a wide range on the y-axis.

With the aforementioned arrangement, the position of the atomic beam in the x- and y-directions can be controlled on the basis of the positions of the probe light A and the probe light B. Furthermore, this control mechanism can be expanded to two-dimensionally control by moving the probe light A in the y-direction and moving the probe light B in the x-direction and setting threshold values as described earlier. The probe light A and the probe light B can be moved using the y-direction beam-position manipulator 56 and the x-direction beam-position manipulator 57 respectively.

Figure 7:
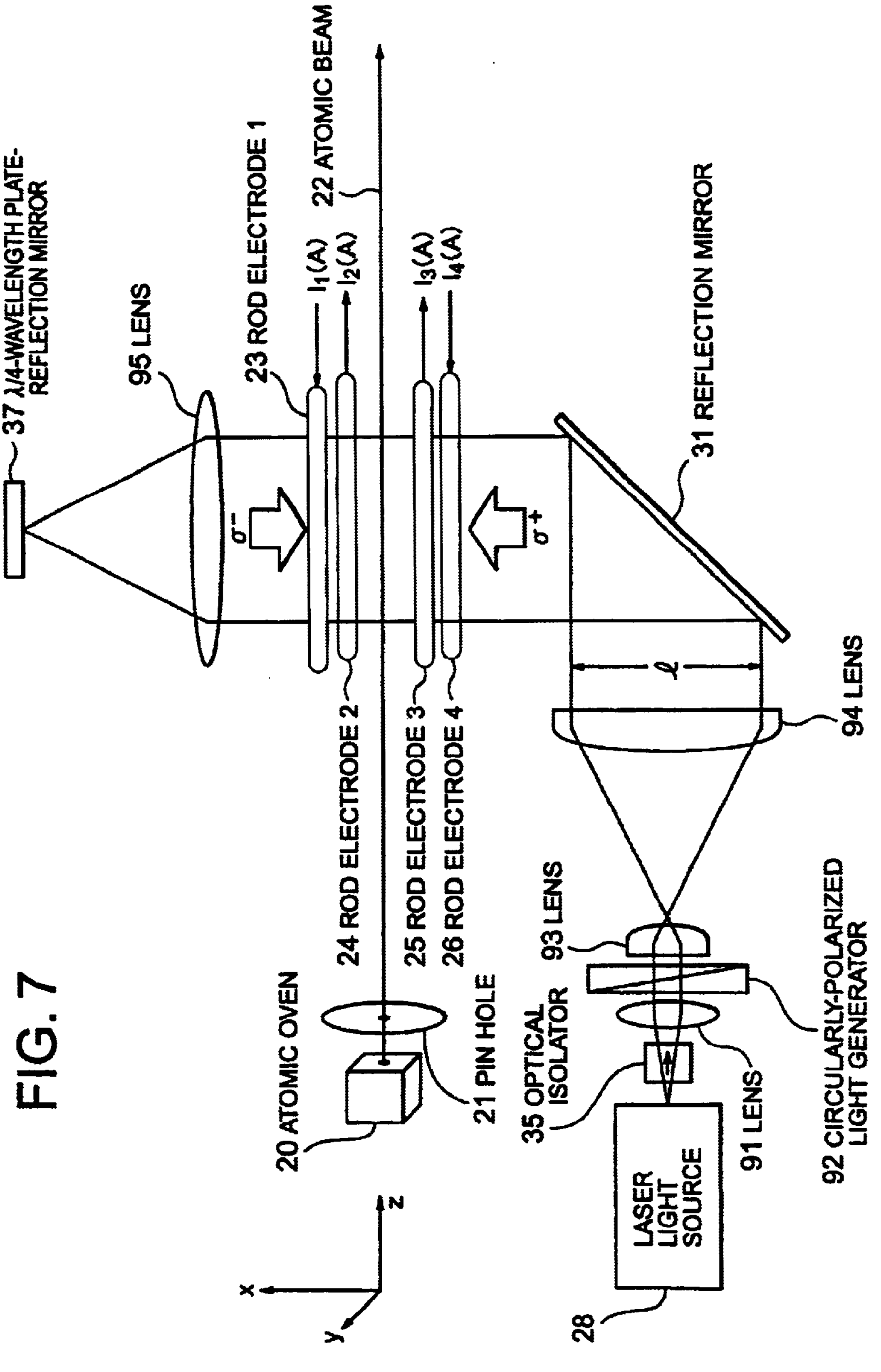
FIG. 7 is a diagram showing an embodiment 3 of the present invention.

FIG. 7 shows embodiment 3 of the present invention. The embodiment 3 of the present invention provides the necessary length of interaction by expanding in advance the laser beam diameter using cylindrical lenses. The embodiment 3 avoids the multiple reflection of the laser light on reflection mirrors in the movement control section. Although FIG. 7 shows a configuration involving only x-direction laser light irradiation, there is a similar configuration in the y-direction, too, similarly involving laser light irradiation. The probe section and the current control section having the same configuration as in the embodiment 2 above have been omitted here in the interests of simplicity.

In FIG. 7, the same reference numerals as used in FIG. 2 refer to the same components. Numeral 20 refers to an atomic oven, 21 refers to a pinhole, 22 refers to an atomic beam, 23, 24, 25 and 26 refer to a rod electrode a, a rod electrode 2 a rod electrode 3 and a rod electrode 4 respectively. Numeral 28 refers to a laser light source, 31 refers to a reflection mirror, 37 refers to a λ/4-wavelength plate-reflection mirror.

Numeral 91 refers to lens, 92 refers to a circularly-polarized light generator, 93 refers to a cylindrical lens 1, 94 refers to a cylindrical lens 2 and 95 refers to a lens.

In the configuration shown in FIG. 7, laser light produced in the laser light source 28 passes through an optical isolator 35 reduced to parallel rays in the lens 91 and then is projected to the circularly-polarized light generator 92 to produce circularly-polarized light (positively circularly-polarized light). The positively circularly-polarized light is further projected to the cylindrical lens 1 and the cylindrical lens 2 to expand to a beam diameter 1. The positively circularly-polarized light whose beam diameter has been expanded is reflected on the reflection mirror 31 and projected to a multiple-pole magnetic field produced by the rod electrode 1 (23), the rod electrode 2 (24), the rod electrode 3 (25) and the rod electrode 4 (26). In the multiple-pole magnetic field, the positively circularly-polarized light beam interacts on the atomic beam 22 The positively circularly-polarized light beam then irradiates the λ/4-wavelength plate-reflection mirror, and is reflected there to become a negatively circularly-polarized light beam. The negatively circularly-polarized light beam interacts with the atomic beam 22 in the multiple-pole magnetic field in the direction opposite to the positively circularly-polarized light beam. A similar light beam and the atomic beam are interacted with each other in the y direction in the multiple-pole magnetic field to control the position of the atomic beam in the x-y plane. Focal distances f1 and f2 of the cylindrical lenses 1 (93) and 2 (94) are determined the values for generating a laser beam diameter (I in FIG. 7) with which the aforementioned movement control section can accomplish the minimum satisfactory interaction length. At the same time, the frequency and intensity of the laser light generated by the laser light source 28 are determined so that can satisfy the conditions described in the description of the operation of the embodiment 2 shown in FIG. 2.

In the embodiment 3 of the present invention where a light beam having a sufficiently large diameter expanded by the cylindrical lens interacts with the atomic beam, multiple reflection mirrors used in the embodiment 2 are not needed, and the equipment configuration of the movement control section can be simplified. This results in an advantage of the ease of alignment of equipment (lenses, mirrors, etc.) for the control.

Figure 8:
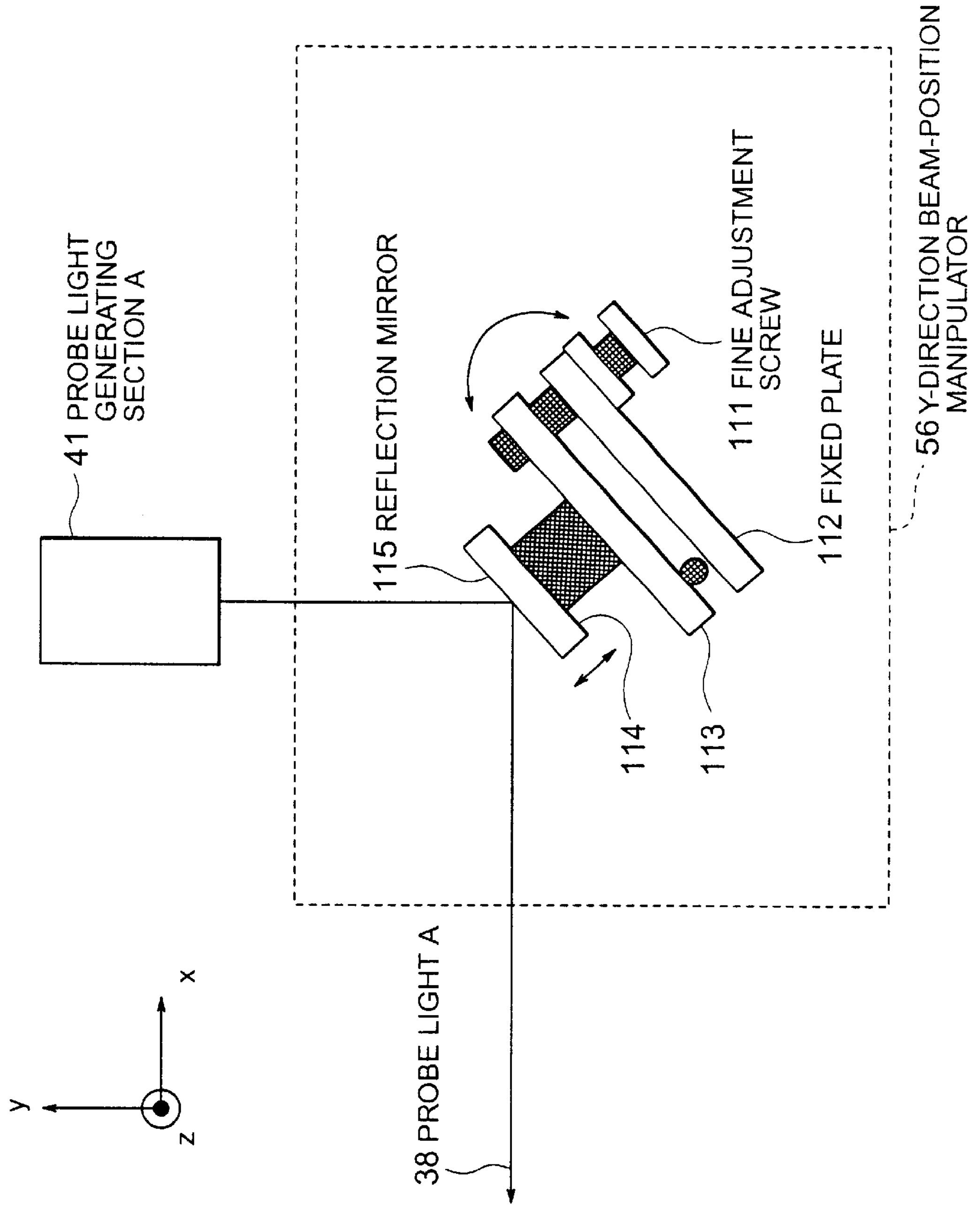
FIG. 8 is a diagram showing an example of a beam-position manipulator, according to an aspect of the present invention.
Figure 9:
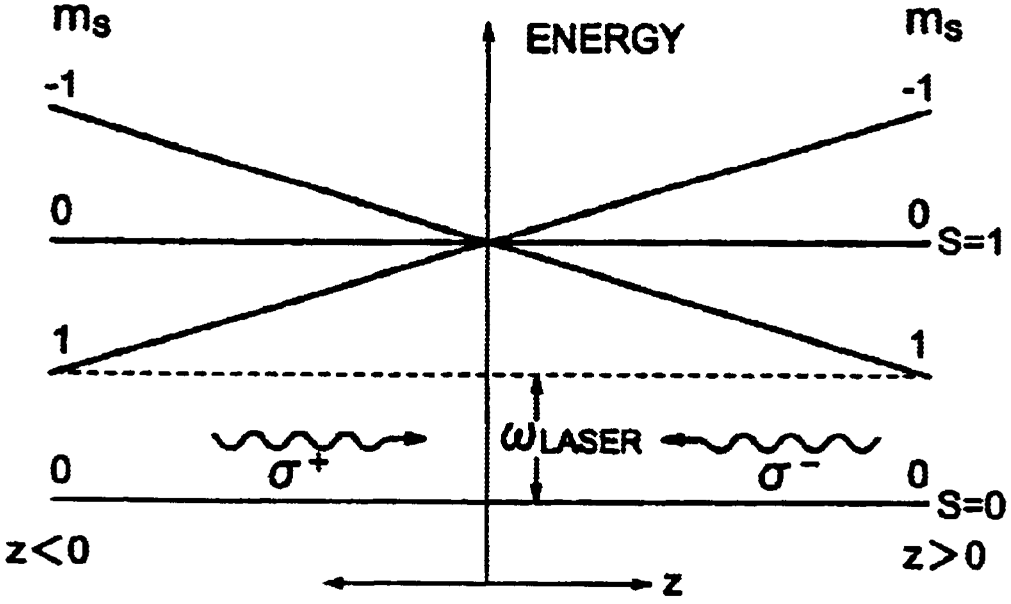
FIG. 9 PRIOR ART
FIG. 9 is a diagram for explaining the operating principle of a magneto-optical trap.

FIG. 8 is a diagram showing an example of the beam-position manipulator according to the present invention where the probe light A is controlled in the y direction.

Numeral 38 refers to a probe light A, 41 refers to a probe light generating section A, and 56 refers to a y-direction beam-position manipulator.

In the y-direction beam-position manipulator 56 numeral 111 refers to a finely threaded screw for roughly adjusting the probe light position. As the finely threaded screw 111 a screw having a screw thread of not more than 1 mm is used. Numeral 112 refers to a fixed plate that is immovably fixed at a position, 113 refers to a directional control plate whose inclination can be changed by the finely threaded screw (111). With this arrangement, the light path of the probe light A can be roughly adjusted in the y direction with an accuracy of about millimeters or less (refer to arrow A shown in FIG. 8.)

Numeral 114 refers to a piezoelectric transducer (PZT) that can slightly move the reflection mirror in the direction shown by an arrow in the figure, as the result of the expansion and contraction of the length of the element itself caused by application of a voltage to the a PZT. Thus a PZT can move the path of the probe light in parallel in the y direction. The application of voltage to the PZT is carried out using a commercially available constant-voltage power supply. The PZT should be chosen by the user, taking into consideration of the properties of PZT, the intended purpose and application. Furthermore, when the need for scanning the substrate with an atomic beam, for example, arises, a desired control can be accomplished by combining a commercially available function generator, etc., with the PZT drive power source. Numeral 115 refers to a reflection mirror.

In the configuration shown in FIG. 8, the probe light A (38) generated by the probe light generating section A (41) is reflected by the reflection mirror and incidents into the light sensor A (refer to FIG. 2.)

By providing two units of the beam-position manipulator of an x-direction beam-position manipulator (57) and a y-direction beam-position manipulator (56) as shown in FIG. 8, the x-direction and y-direction manipulation of the probe light can be carried out with high precision.

According to the present invention, which uses a probe light focused to the diffraction limit of light, the position of the atomic beam can be controlled with an accuracy of about the wavelength of light. At the same time, the position of the atomic beam can be optimized and stabilized with a similar accuracy. In addition, two-dimensional automatic positioning can be achieved by two-dimensionally moving the atomic beam with high accuracy by changing the spatial position of the probe light and the control threshold value. At the same time, the formation of a collimated high-density atomic beam and selection of isotopes can be automatically accomplished. In this way, the present invention can realize a collimated high-density atomic beam using the laser cooling effect, and carry out two-dimensional position control by selectively extracting desired isotopic atoms.

The many features and advantages of the present invention are apparent from the detailed specification and, thus, it is intended by the appended claims to cover all such features and advantages of the invention which fall within the true spirit and scope of the invention. Further, since numerous modification and changes will readily occur to those skilled in the art, it is not desired to limit the invention to the exact construction and operation illustrated and described, and accordingly all suitable modification and equivalents falling within the scope of the invention may be included in the present invention.

What is claimed is:

1. An atomic beam control apparatus controlling a position of an atomic beam that passes through a multi-pole magnetic field by irradiating the atomic beam with a light beam, the apparatus comprising:

a probe light generator to generate a probe light to detect the position of the atomic beam;

a light sensor to receive the probe light; and a current control section to control a current flowing in multi-pole magnetic field generating electrodes to control the position of the atomic beam, wherein the light beam irradiates the atomic beam so that the atomic beam interacts with both the light beam and the magnetic field, and the position of the atomic beam is controlled by controlling the current fed to the multiple-pole magnetic field generating electrodes based on output values of the light sensor receiving the probe light.

2. The atomic beam control apparatus as recited in claim 1, further comprising:

a deviation control section to calculate a deviation of the atomic beam position from the target position of the atomic beam based on the output values of the light sensor, wherein the current control section controls the current flowing in the multi-pole magnetic field generating electrodes in accordance with output values of the deviation control section.

3. An atomic beam control method controlling a position of an atomic beam that passes through a multi-pole magnetic field by irradiating the atomic beam with a light beam, the method comprising:

generating probe light to detect the position of the atomic beam;

receiving the probe light, wherein the light beam irradiates the atomic beam so that the atomic beam interacts with both the light beam and the magnetic field; and irradiating the atomic beam and detecting the position of the atomic beam; and controlling the position of the atomic beam by controlling currents fed to multiple-pole magnetic field generating electrodes based on the received probe light.

4. The atomic beam control method as recited in claim 3, further comprising:

extracting isotopes by spatially separating only the isotopes from an atomic source comprising a plurality of isotopes by using spectral-narrowed laser light as the light beam to control a movement of atoms; and selectively controlling a movement of the isotopes in the atomic beam.

5. The atomic beam control method as recited in claim 3, further comprising:

calculating a deviation between a target position of the atomic beam and the position of the atomic beam based on the received probe light; and controlling the currents fed to the electrodes to generate a multiple-pole magnetic field based on the deviation.

6. The atomic beam control apparatus as recited in claim 2, the deviation control section comprising:

a deviation calculating circuit and a threshold value setting section, wherein the deviation control section obtains one of the output values of the light sensor corresponding to a central position of the light beam being $T_0$, the threshold value setting section calculates an output value $T_1$ corresponding to another of the output values of the light sensor at a position between the central position of the light beam $T_0$ and a light beam outside diameter, the deviation calculating circuit calculates a deviation $Yd=T_1-T_0$, and the current control section controls the currents flowing in the multiple-pole magnetic field generating electrodes based on the deviation Yd.

7. The atomic beam control apparatus as recited in claim 6, wherein the current control section comprises PID control circuits.

8. The atomic beam control apparatus as recited in claim 7, further comprising:

a current source comprising a synthesizing section to synthesize an x-direction deviation and a y-direction deviation, wherein a current determined by synthesizing the x-direction deviation and the y-direction deviation is fed to the multiple-pole magnetic field generating electrodes.

9. The atomic beam control method as recited in claim 3, further comprising:

obtaining an output value $T_0$ of the light sensor corresponding to a central position of the light beam;

calculating an output value $T_1$ corresponding to one of the output values of the light sensor at a position between a central position of the light beam and an outside diameter of the light beam; and calculating a deviation $Yd=T_1-T_0$ so that currents flowing in the multiple-pole magnetic field generating electrodes are controlled based on the deviation Yd.

10. The atomic beam control method as recited in claim 9, wherein currents are controlled by PID control circuits.

11. The atomic beam control method as recited in claim 10, further comprising:

determining a current by synthesizing an x-direction deviation and a y-direction deviation; and feeding the current to the multiple-pole magnetic field generating electrodes.

12. The atomic beam control apparatus as recited in claim 1, wherein the atomic beam is controlled by detecting a relative position of the probe light and the atomic beam.

13. The atomic beam control method as recited in claim 3, further comprising:

controlling the atomic beam by detecting a relative position of the probe light and the atomic beam.

* * * * *